United States Patent
Pare, Jr. et al.

(10) Patent No.: US 8,824,386 B2
(45) Date of Patent: *Sep. 2, 2014

(54) METHOD AND SYSTEM OF OPERATING A MULTI-USER SYSTEM

(75) Inventors: Thomas E. Pare, Jr., Mountain View, CA (US); Cheng-Hsuan Wu, Jhubei (TW); Yung-Szu Tu, Jhubei (TW); Kiran Uln, Pleasanton, CA (US); Ravishankar H. Mahadevappa, San Jose, CA (US)

(73) Assignee: Mediatek Inc., Hsin-Chu (TW)

( * ) Notice: Subject to any disclaimer, the term of this patent is extended or adjusted under 35 U.S.C. 154(b) by 232 days.

This patent is subject to a terminal disclaimer.

(21) Appl. No.: 13/041,177

(22) Filed: Mar. 4, 2011

(65) Prior Publication Data

US 2011/0274003 A1    Nov. 10, 2011

Related U.S. Application Data

(60) Provisional application No. 61/345,108, filed on May 15, 2010, provisional application No. 61/331,476, filed on May 5, 2010.

(51) Int. Cl.
  *H04W 4/00*     (2009.01)
  *H04W 4/08*     (2009.01)
  *H04W 4/20*     (2009.01)
  *H04W 8/18*     (2009.01)
  *H04B 7/04*     (2006.01)

(52) U.S. Cl.
  CPC ............... *H04W 4/08* (2013.01); *H04W 4/206* (2013.01); *H04W 8/186* (2013.01); *H04B 7/0452* (2013.01)
  USPC ........................................... 370/329; 370/346

(58) Field of Classification Search
  USPC .................................................. 370/351, 352
  See application file for complete search history.

(56) References Cited

U.S. PATENT DOCUMENTS

| | | | |
|---|---|---|---|
| 5,835,860 A | 11/1998 | Diachina | |
| 7,920,533 B2 | 4/2011 | Koo et al. | |
| 8,270,909 B2 * | 9/2012 | Zhang et al. | 455/69 |
| 8,483,200 B2 | 7/2013 | Cha et al. | |
| 2007/0117590 A1 * | 5/2007 | Aldana | 455/562.1 |
| 2007/0195811 A1 | 8/2007 | Basson et al. | |
| 2008/0125124 A1 | 5/2008 | Craig | |
| 2008/0214198 A1 * | 9/2008 | Chen et al. | 455/450 |
| 2008/0268857 A1 | 10/2008 | McCoy et al. | |
| 2010/0279700 A1 * | 11/2010 | Kim et al. | 455/452.1 |
| 2012/0269146 A1 | 10/2012 | Pajukoski et al. | |

FOREIGN PATENT DOCUMENTS

| | | |
|---|---|---|
| WO | WO2009147570 | 12/2009 |
| WO | WO2010017101 A2 | 2/2010 |

\* cited by examiner

*Primary Examiner* — Marcus R Smith
(74) *Attorney, Agent, or Firm* — Sawyer Law Group, P.C.

(57) ABSTRACT

A method and system is disclosed for grouping the multiple stations connected to an access point (AP). The system and method comprise sending a sounding packet to a plurality of stations, wherein the stations may be all or part of the stations that are located within the range of the AP. The stations that receive the sounding packets respond to the AP, and the AP determines the channel state information (CSI) from the responses. According to the CSI, the AP divides the multiple stations into several groups. According to an embodiment of the present invention, a confirmation step is performed to each group of stations, respectively. The AP sends a second sounding packet to each group of stations, and verifies the CSI between each station group by group. Therefore, the method and system provides for monitoring the validation of each group by periodically sending sounding packets to each group.

16 Claims, 5 Drawing Sheets

METHOD AND SYSTEM OF OPERATING A MULTI-USER SYSTEM

CROSS-REFERENCE TO RELATED APPLICATIONS

Under 35 USC 119(e), this application claims the benefit of U.S. Provisional Application No. 61/331,476 filed on May 5, 2010, entitled "METHOD FOR GROUPING WITH SOUNDING PACKETS," and U.S. Provisional Application No. 61/345,108, filed on May 15, 2010, entitled "METHOD OF OPERATING MULTI-USER SYSTEM," all of which are incorporated herein by reference.

The present invention is related to co-pending U.S. patent application. Ser. No. 13/041,068, entitled "METHOD AND SYSTEM OF OPERATING MULTI-USER SYSTEM," filed on even date herewith and assigned to the assignee of the present invention, which is incorporated herein by reference.

FIELD OF THE INVENTION

The present invention relates to a method of operation in a multi-user system, and more particularly, to a method of grouping operation in a multi-user system.

BACKGROUND

A wireless local area network (WLAN) is widely used to provide access to the internet with mobile devices. To improve the throughput in a WLAN, the IEEE 802.11n standard adopts a multiple input multiple output (MIMO) system that transmits a plurality of streams with multiple antennas and, at the same time, receives the streams with multiple antennas. However, the IEEE 802.11n standard is still based on a point-to-point transmission scheme. When there are more stations connected to the access point (AP), the AP has to hold the transmission for some stations while transmitting to another and wait for an empty time slot.

In order to transmit to multiple stations (STA) on the same channel (frequency band) in a multi-user (MU) system, the downlink (DL) channels may be orthogonalized to create virtual spatial channels. Some conventional systems are described in "Zero-Forcing Methods for Downlink Spatial Multiplexing in Multi-User MIMO Channels", *IEEE Transactions On Signal Processing*, Vol. 52, No. 2, February 2004, Q. Spencer, A. L. Swindlehurst, and M Haardt. In this publication, and in later references, a set of pre-coding matrices is computed at the AP for a group of downstream users. The effective pre-coded channel is block diagonalized so that the interference between stations is minimized.

For this system to work effectively there must be cooperation between the AP and the remote stations. First, the stations must feedback channel information to the AP for pre-coder computation. In certain cases where the individual station channels are highly correlated, pairs of stations may not be compatible to be grouped for MU transmission due to a poor solution space for MU pre-coding matrices. In addition, MU channels are more sensitive to changing channel conditions, since variations in the channel can lead to loss of pre-coded orthogonality and quickly lead to high interference conditions. Many designs only consider grouping without regard to compatibility of the stations, while other systems do not provide real time metrics to assess the status of the channel condition. These two factors can limit the performance of a MU-MIMO downlink (DL). Hence, there's a need to provide a method to form stations into compatible multi-user (MU) groups, and the need for a mechanism to quickly identify interference conditions caused by variations in the wireless MU channel.

Therefore, a multi-user (MU), or multi-station, transmission system with MIMO system can be provided. The AP in a MU-MIMO system can transmit data to multiple stations either with multiple antennas or a single antenna at the same time, such that the AP can serve more stations at the same time. However, there's still a need for a method to improve the reliability and functionality of a MU system.

SUMMARY OF INVENTION

It is therefore an object of the present invention to provide a method for grouping the multiple stations connected to an AP The method comprises sending a sounding packet to a plurality of stations, wherein the stations may be all or part of the stations that are located within the range of the AP. The stations that receive the sounding packets respond to the AP, and the AP determines the channel state information (CSI) from the responses. According to the CSI, the AP divides the multiple stations into several groups. According to an embodiment of the present invention, a confirmation step is performed to each group of stations, respectively. The AP sends a second sounding packet to each group of stations, and verifies the CSI between AP and each station group by group.

In another embodiment of this invention, the AP will compute the pre-coding matrices and determine the compatibility between stations of a certain group by computing a certain gain metric and comparing it to a preset threshold limit.

It is therefore another object of the present invention to provide a method for monitoring the validation of each group by periodically sending sounding packets to each group.

It is therefore another object of the present invention to provide a method for monitoring the validation of each group by periodically sending sounding packets to each group in order to measure the interference between each of the stations and feed this information back the MU AP.

In another embodiment of this invention, the AP will continuously monitor the interference levels between each of the stations transmit streams, resound the down stream channels and re-compute the pre-coding matrices when the interference levels reach a pre-set threshold.

In yet another embodiment of this invention the AP will continuously monitor the interference levels between each of the stations transmit streams and eliminate a particular station from the group when the interference levels reach a pre-set threshold.

BRIEF DESCRIPTION OF DRAWINGS

The accompanying drawings illustrate an embodiment of the present invention and, together with the description, serve to explain the principle of the invention. One skilled in the art will recognize that the particular embodiments illustrated in the drawings are merely exemplary, and are not intended to limit the scope of the present invention.

DETAILED DESCRIPTION OF PREFERRED EMBODIMENTS

The present invention relates to a method of operation in a multi-user system, and more particularly, to a method of grouping operation in a multi-user system. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Figure 1:
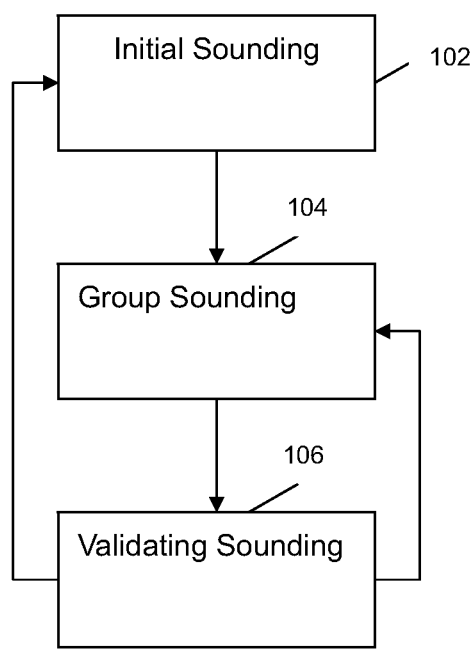
FIG. 1 illustrates a flow chart of grouping stations validation according to an embodiment of the present invention.

FIG. 1 illustrates a flow chart 100 of grouping stations according to an embodiment of the present invention. There are three modes for grouping stations, the initial sounding mode 102, then a grouping mode 104, and then a validation mode 106.

A method and system that provides for the grouping of stations in accordance with the present invention can take the form of an entirely hardware implementation, an entirely software implementation, or an implementation containing both hardware and software elements. In one implementation, this grouping system and method is implemented in software, which includes, but is not limited to, application software, firmware, resident software, microcode, etc.

Furthermore, the detection procedure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present invention in more detail, refer now to the following description in conjunction with the accompanying Figures.

Initial Sounding 102.

The initial sounding mode 102 is executed to sound the channels without targeting any specific group. The sounding could be in the form of a null data packet (NDP) dedicated for sounding or it could be accomplished as part of a MU downstream data packet. In this stage, the packets are not beamformed or pre-coded, and the AP requests the channel state information from the stations. In response to the initial sounding from the access point (AP), the stations (STAs) send back channel state information (CSI) to the AP. Then, the AP uses the CSI from each of the STAs to determine the group definitions and informs STAs of the group membership.

In order to improve the performance in a MU-MIMO system, the AP first performs an initial sounding by sending a sounding packet to a large number of stations. These stations may be all or part of the stations within the range covered by the AP. The stations that receive the sounding packet send a respond to the AP. The AP obtains channel state information (CSI) from the responses. The stations are then divided into groups in some logical order. One possible way is to roughly group them according to some measure of orthogonalization.

For example, the CSI returned to the AP for each station is stacked in a column matrix Htot_csi, as, $$H\text{tot\_csi}=[H0; H1; H2 \ldots Hn]$$

wherein n is the number of stations sending a response to the AP.

Since the grouping is determined based on CSI, the stations within the same group might be stations physically close to each other. On the contrary, stations within the same group might be spaced apart, such that the interference is minimized. Moreover, each station may be grouped into one or more groups.

After the initial grouping, the AP may then sound to a particular group by sending a sounding packet again. This sounding step may be performed with a beamformed (or pre-coded) packet or a non-beamformed packet. If the packet is not beamformed, this step may be combined with the initial sounding.

Group Sounding 104.

The group sounding could be executed to sound the channels of specific groups. They could be either null-data-packet (NDP) sounding or they could be performed with multicast (to a specific group) data. Packets are not beamformed or precoded. During group sounding, packets are transmitted from AP, and then the STAs in the targeted group send back CSI to the AP. Then, the AP determines the number of space-time streams for each STA and, accordingly, the steering/precoding matrix.

For example, if the packet is not beamformed, for a particular group having 3 stations, the group CSI Hgroup at the AP may be expressed as:

$$Hgroup = \begin{bmatrix} h00 & h01 & h02; \\ h10 & h11 & h12; \\ h20 & h21 & h22 \end{bmatrix};$$

In this case, each element could be a row vector, and the "coupling terms" are the off-diagonal terms. If they are large compared to the diagonal terms h00, h11, h22, then there will be considerable interference between the stations, which is not good for performance.

Therefore, the AP computes a pre-coding, or steering matrix V=[V1 V2 V3] such that $$Hgroup \times V^* \approx \begin{bmatrix} hv00 & 0 & 0; \\ 0 & hv11 & 0; \\ 0 & 0 & hv22 \end{bmatrix};$$

Because of imperfections at the transmitter, and any variable channel conditions, the zero terms will not be identically zero, but close to zero, or comparatively small with the diagonal terms.

Validation Sounding 106.

These could be executed to sound the effective channels of specific groups with beamforming or precoding. They could be NDP sounding or performed with DL MU-MIMO (to a specific group) data. Packets are beamformed or precoded. After validation, sounding packets are transmitted from the AP. The STAs in the targeted group either: (1) Send back the CSI corresponding the pre-coded channel to the AP; or (2) compute the signal-to-interference ratio (SINR) of the preamble or data, and send it back to the AP. Then, the AP determines whether the grouping is valid or the steering/precoding matrix has to be updated.

If the grouping is not valid, then: (1) first go to the initial sounding mode to determine the new group; or (2) directly determine the new group definitions and go to the group sounding mode.

If the steering/precoding has to be updated, then: (1) go to the group sounding mode to determine the new steering/precoding matrix.

According to another embodiment of the present invention, a validation step is performed in which the AP sends a beamformed sounding packet, which could be null data packet (NDP). The CSI beamformed at this step should be "diagonal" as above. The AP double-checks the magnitude of the off-diagonal terms in the matrix. The relative size of these terms (using any vector norm, or Frobenius norm, for example, if these are MIMO stations, since these off-diagonal terms could be matrices) with respect to the diagonal terms will determine how much interference there will be between the stations, i.e. signal-to-interference ratio (SINR) value. After this step, the AP is able to finally choose a proper modulation and coding scheme (MCS), based on signal to noise (SNR) (RSSI), and SINR, and prescribe the number of long training frames (LTF) per station. If the metrics are satisfactory, data transmission mode can start after this step.

According to another embodiment of this invention, a steady state mode is also performed where the AP may periodically send non-beamformed sounding packets to the group to periodically update a steering matrix V. Intermittently, the AP can send beamformed sounding packets to keep track of the SINR/SNR of the downlink condition of the multi-station (MU-DL). This metric can be used to re-assess the group, such as removing a particular station, which has lost orthogonality, or re-grouping, such as effectively killing the group, and starting the grouping process over, when the channel changes too drastically.

Moreover, once SINR validation is used, SINR can also be used to assign the number of spatial streams (Nss) to each station.

At the validation/assignment step, the system may re-compute the steering matrices. For example, a 2Rx STA may only be assigned Nss=1, because the residual coupling on one Rx chain was high. In this case, the second Rx chain will be ignored. The second chain will then correspond to a direction not used for data; instead, this direction will contain cross-coupling interference. In this case, the Rx may choose to shut down (power down) the second receiver chain in order to minimize effective noise from entering the Rx front end.

According to an embodiment, the AP selects the Rx-chain, rather than the antenna, for each station and re-computes the steering matrices, using unused directions to improve isolation (or reduce interference) between stations.

Implementation

Figure 2:
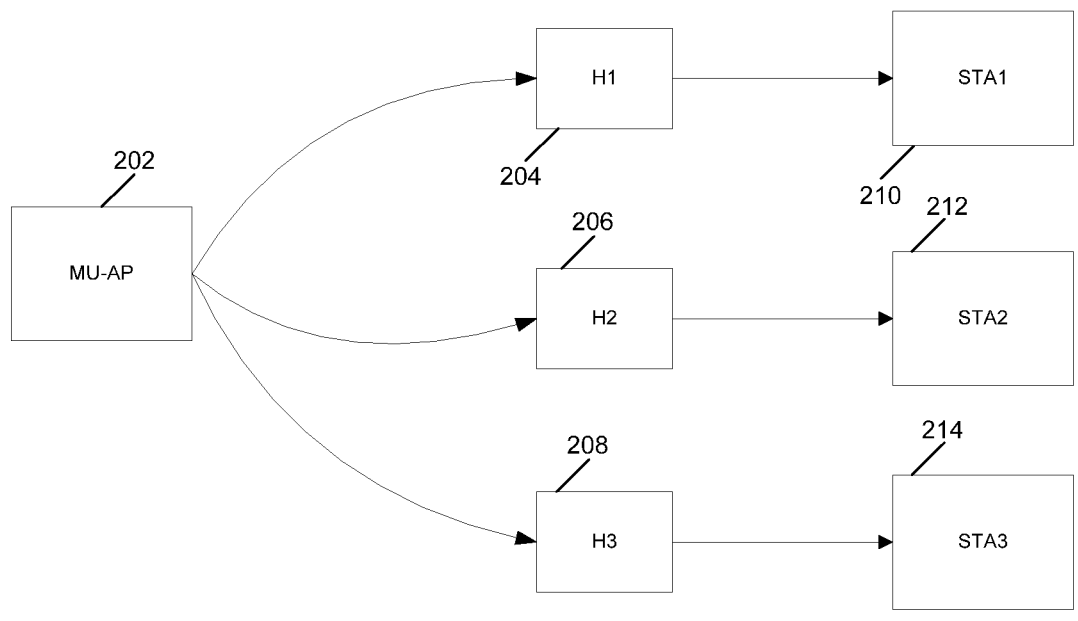
FIG. 2 illustrates a block diagram of DL MIMO AP to 3 stations according to an embodiment of the present invention.

According to an embodiment 200 of the present invention, when there are 3 stations within a MU network 202, such as in the case in FIG. 2, the simultaneous channels 204, 206 and 208 to the three STAs 210, 212 and 214 can be expressed as:

$$H = \begin{bmatrix} H_1 \\ H_2 \\ H_3 \end{bmatrix}$$

and the signal received at the remote stations 210, 212 and 214 can be expressed as (neglecting noise terms):

$$[Y] = \begin{bmatrix} Y1 \\ Y2 \\ Y3 \end{bmatrix} = \begin{bmatrix} H_1 \\ H_2 \\ H_3 \end{bmatrix} X$$

Therefore, in this embodiment, the transmitted signal X may contain components for each station and each is precoded by the matrix V:

$$X = V \begin{bmatrix} X1 \\ X2 \\ X3 \end{bmatrix} = [V1 \quad V2 \quad V3] \begin{bmatrix} X1 \\ X2 \\ X3 \end{bmatrix}$$

In general each station can be transmitted multi-stream data:

$$X_i = \begin{bmatrix} x_1 \\ \vdots \\ x_n \end{bmatrix}.$$

The precoding matrices $$V=[V1\,V2\,V3]$$

are computed such that the effective channels 204, 206 and 208 to the independent STAs 210, 212 and 214 are orthogonal, or independent of one another. In other words, transmission to one STA does not interfere with the other STA in the MU group.

According to an embodiment of the present invention, the matrices $V_i$ in general need to be orthogonal to the channel matrices corresponding to the other stations in the group. That is;

$$H_j V_i = 0, i \neq j.$$

In this case, the columns of the precoding matrices $V_i$ are said to lie in the Null Space of $H_j$. Candidate precoding matrices $V_i$ can be computed using the QR decomposition.

The QR decomposition can be used to compute null spaces. Consider a general complex matrix A, which is m×n, m<n. Then, the QR decomposition can be used to decompose the matrix as $$A^*P=QR=[Q_1 Q_2]R,$$

where P is a permutation matrix, and the relative dimensions are specified as:

$$Q:n \times n$$

$$R:n \times m$$

$$Q_1:n \times m$$

$$Q_2:n \times (n-m)$$

Given this partition, the orthogonality condition results:

$$AQ_2 = 0.$$

In this case, the columns of $Q_2$ span the nullspace (or, right nullspace) of the matrix A. This is expressed as:

$$N(A) = Q_2.$$

Hence, according to an embodiment of the present invention, in order to find the precoding steering matrices $V_i$ for the 3 stations system described above, the following conditions must hold:

$$V_1 \in N\left(\begin{bmatrix} H_2 \\ H_3 \end{bmatrix}\right) \stackrel{def}{=} N_1$$

$$V_2 \in N\left(\begin{bmatrix} H_1 \\ H_3 \end{bmatrix}\right) \stackrel{def}{=} N_2$$

$$V_3 \in N\left(\begin{bmatrix} H_1 \\ H_2 \end{bmatrix}\right) \stackrel{def}{=} N_3$$

More precisely, the columns of the precoding matrices $V_i$ might have belonged to the nullspace $N_i$, which is called Condition 1, and could be expressed as:

$$\text{CONDITION 1:} \begin{cases} N_1 = \left\{v \in C^n \left| \begin{bmatrix} H_2 \\ H_3 \end{bmatrix} v = 0\right.\right\} \\ N_2 = \left\{v \in C^n \left| \begin{bmatrix} H_1 \\ H_3 \end{bmatrix} v = 0\right.\right\} \\ N_3 = \left\{v \in C^n \left| \begin{bmatrix} H_1 \\ H_2 \end{bmatrix} v = 0\right.\right\} \end{cases}$$

Condition 1 simply means that the precoding matrices for a particular station must lie in a Nullspace of the other stations, to guarantee low interference between the stations. While this condition will guarantee low interference in the MU group, for good performance, the transmission to the stations has to be strong. In other words, there's a need for a second condition to guarantee reasonable transmission:

$$\text{CONDITION 2:} \begin{cases} H_1 N_1 \neq 0 \\ H_2 N_2 \neq 0 \\ H_3 N_3 \neq 0 \end{cases}$$

Here, condition 2 means that the channel to each station can not lie in the Nullspace of the other stations. This can happen, in general, if two stations are strongly correlated. The chance that any of the conditions in Condition 2 will not happen "precisely" (meaning that one of the equations in (condition 2) is exactly "zero") is probably small. The design of the precoding matrices should be done to minimize the chance of Condition 2 occurring, as described below.

To minimize the chance that Condition 2 occurs, according to an embodiment of the present invention, the precoding matrices are selected to maximize the received strength of transmission to each station. That is, after the corresponding nullspaces are found, the following optimization problem has to be solved:

$$\max_{V_i \in N_i} \|H_i V_i\|.$$

For example, in a particular scenario, where the stations are either 1 or 2 spatial streams capable. For these cases, consider the dimensions such that H is 5×8, and the individual stations are defined by the following scenario:

$$\text{Scenario: } H(5 \times 8) \stackrel{\Delta}{=} \begin{cases} H_1 \text{ is } 2 \times 8 \\ H_2 \text{ is } 2 \times 8 \\ H_3 \text{ is } 1 \times 8 \end{cases}$$

For these stations, the corresponding Nullspaces dimensions are $$\text{Nullspaces: } \begin{cases} N_1 \text{ is } 8 \times 5 \\ N_2 \text{ is } 8 \times 5 \\ N_3 \text{ is } 8 \times 4 \end{cases}$$

For STA3 214, which is one stream, the dimension of $N_3$ is 8×4, and can be written a set of vectors:

$$N_3 = [n_1 \ldots n_4]$$

The precoding matrix $V_3$ is 8×1, and can be written as a linear combination of the columns of $N_3$, as:

$$V_3 = N_3 a, \text{ where is a is a vector of coefficients as}$$

$$a = \begin{bmatrix} a_1 \\ \vdots \\ a_4 \end{bmatrix}.$$

In order to choose a to maximize the signal strength at the 3rd receiver. The received signal is expressed as:

$$Y_3 = H_3 V_3 X_3$$
$$= H_3 N_3 a X_3.$$

The problem then reduces to finding the vector a that gives good transmission through the effective channel:

$$H_3 N_3 \stackrel{\Delta}{=} h_3.$$

In this one spatial stream (1SS) case, $h_3$ is a 1×4 complex row vector. The energy maximizer is then:

$$\bar{a}_3 \stackrel{\Delta}{=} h_3^3 / \|h_3^3\|$$

That is, the maximizer is the complex conjugate of the vector $H_3$. In this case $h_3$ is the projection of the Nullspace of the STA1 210 and STA2 212 channels onto the channel of STA3 214. The maximizer $\bar{a}_3$ will maximize the energy gain through this projection space.

The optimal precoding matrix is then:

$$\{N_3 \bar{a}_3\}(k) = V_3(k).$$

The final step is to assess the MU-MIMO gain through the channel, to determine if the MU constraint was too restrictive for this particular station. One possible metric approach is to compare the MU-Gain to the unrestricted BF gain:

$$\text{MU-GAIN}(k) = |H_3 V_3| / \|H_3\|(k).$$

This metric is summed over all $N_{3c}$ subcarriers. It provides a measure of how much energy was lost by restricting the precoder to lie in the Nullspace $N_3$. Only include this 1SS station if the MU-GAIN is above a threshold:

MU Group Requirement:

$$\sum_{k=0}^{k=N_{sc}} |H_3 V_3|/\|H_3\|(k) > \text{THRESH}.$$

Please note that, in practice, $\{N_3\bar{a}_3\}(k)=V_3(k)$ would be computed for each subcarrier k. Each subcarrier then has an 8-element precoding coefficient. The squared sum for each Tx component is computed across all subcarriers, and the total is stored for each Tx. The maximum of the 8-energies is determined, and this value is scaled so that the maximum energy at the strongest transmitter does not overdrive the Tx PA. The final normalizing step should be done after all the precoding matrices are computed for each STA, to make sure the MU power constraint is satisfied.

Note also that the solution is the 2-norm maximizer which is also the maximum power gain through the channel subspace. However, other solutions may be chosen to maximize the 1-norm or ∞-norm, for different emphasis.

Note also that if the MU Group requirement is not satisfied, the station can be removed from the group, the number of stations reduced by 1, and the Nullspaces recalculated.

Note also that the MU-Gain threshold may be dependent on RSSI. It could happen that the signal strength to the particular station is so strong that the threshold is relaxed.

According to another embodiment of the present invention, for STA1 210 and STA2 212, which are 2-stream devices, the dimensions of $N_{1,2}$ are 8×5, and can be written according to a set of vectors:

$$N_{1,2}=[n_1 \ldots n_5].$$

In this case, the precoding matrices $V_{1,2}$ are 8×2, and of the form: $V_1=N_1 A$, where $N_1$ is 8×5 and $A$ is a 5×2 complex matrix, and the received signal expressed as:

$$Y_1 = H_1 V_1 X_1$$
$$= H_1 N_1 A X_1.$$

The problem then reduces to finding the directions that give good transmission through the effective 2×5 channel:

$$H_1 N_1 \triangleq h_1.$$

In this case, the maximum power gain objective leads to an SVD solution for the matrix A. Specifically, if $h_1=U\Sigma V^*$, then the optimal solution for the 2SS transmission is: $\bar{A}=V$. For a 2 spatial stream (2SS) channel, the SVD has a closed form solution.

At this step, the algorithm can check the condition of the channel to assess whether or not 2 spatial streams is feasible under the MU channel assumptions. This can be done by comparing the relative strength of the two singular values in $\Sigma$, to make sure the smaller value is not attenuated too much. If the MU-AP concludes only 1SS is possible to STA1 210, or STA2 212, it can assign 1SS.

Please note that two normalization steps are needed, one assuming 1SS transmission, the other assuming 2SS is sent. Both need to normalize the power at each of the 8 Tx so that none are over-driven into a poor EVM state. The first is just the same as in the 1SS station, since $\{N_1 \bar{A}_1\}(k)=V_1(k)$, for 1SS, only $\bar{a}_1$, the first column of $\bar{A}=[\bar{a}_1 \ \bar{a}_2]$ is used for transmission.

For 2SS, the magnitude of each row of $\{N_1 \bar{A}_1\}(k)=V_1(k)$ is computed, and summed over the subcarriers. Again, the output of the precoding matrices corresponding to each of the transmitters is scaled to prevent the maximum power from saturating any of the eight transmitters.

In summary, the Precoding Design described above can be integrated into a process that can be executed by a MU capable AP. In the process of computing the precoders, the membership in each group is also assessed using a metric; i.e., the MU groups are formed as part of the computation of the MU precoders.

Note also, that although the preceding grouping process required CSI as measured by the channel matrices, the identical process can be achieved using alternate representation for CSI. As an example, consider the singular value decomposition for each channel given by: $H=U\Sigma V^*$. The same steps above can be followed by substituting the $\bar{H}=\Sigma V^*$. In this case, the requisite null spaces and peak input gain directions can be calculated using this alternate CSI information.

Figure 3:
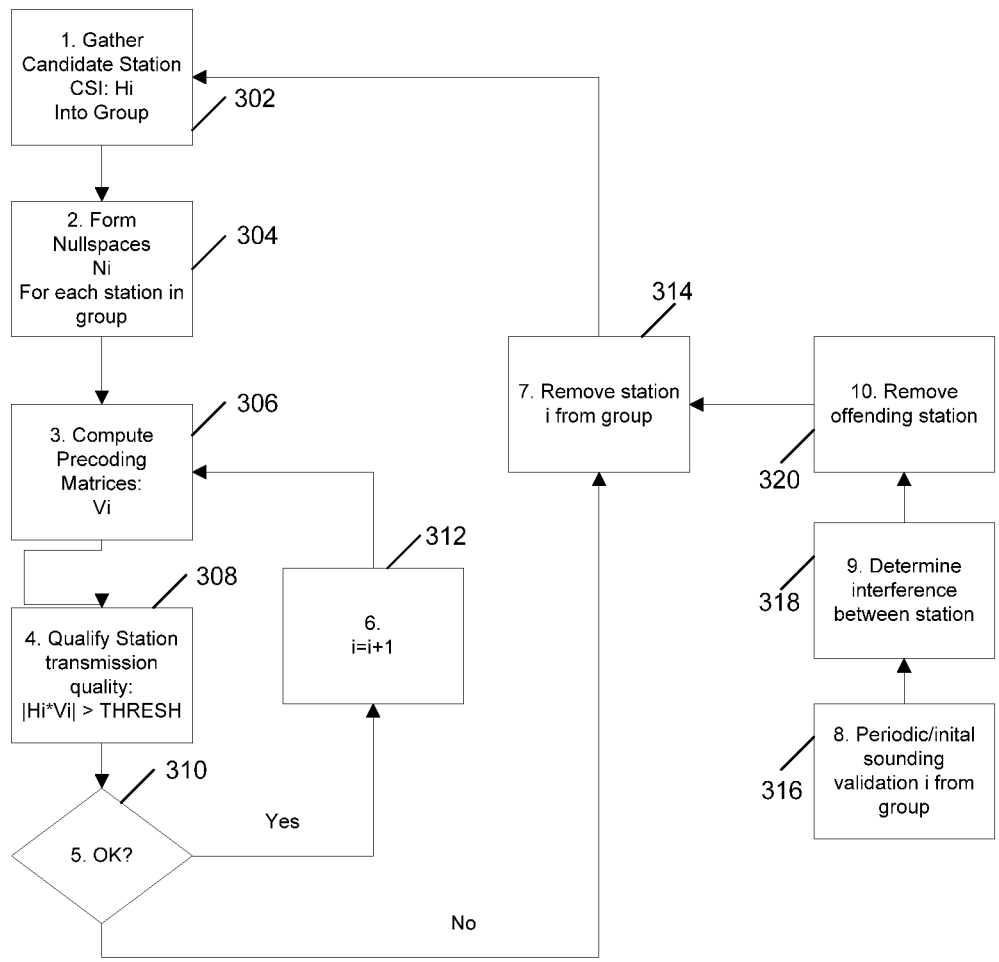
FIG. 3 illustrates a flowchart for forming groups for MU operation according to an embodiment of the present invention.

Please refer to FIG. 3, which illustrates a process flow 300 according to an embodiment of the present invention. At Step 302, the candidate MU capable STA associated with the AP are sounded, and the channel state information (CSI) for each station is gathered to form a pool of candidate stations. A subset of these stations is formed into a candidate group of $N_G$ stations. The criteria for initial group formation at Step 302 might include similar types of data traffic, or some initial orthogonality test to ascertain a group of stations' compatibility for MU operation.

At Step 304, the Null spaces $N_i$ of all the candidate stations in the group are computed.

At Step 306, the precoding matrix $V_i$ are computed for each station.

At Step 308, the transmission quality of the precoder is computed, and tested against a threshold. If the threshold condition is met at Step 310, this particular station is considered a group member, and the next station is considered, at Step 312. The process Steps 306, Step 308, and Step 310 are then repeated for the next indexed group candidate.

At step 310, if a particular candidate is not considered a valid group member, that station is disqualified from the group, as shown in Step 314. In this case, that candidate CSI is eliminated from the set of channel matrices (Step 302), and the corresponding Nullspaces for each candidate recomputed (Step 304). The iterative process of Steps 306, Step 308 and Step 310 are repeated for each station in the candidate group.

After the final membership in the Group is established, by using the flow 300 shown in FIG. 3, the final precoding scheme can be validated by issuing a sounding request to the group. This sounding request packet, via step 316, should be sent prior to the start of data, and can be used to assess the actual levels of interference, via step 318, between the stations. After the final group assessment and during the MU data transmission, a periodic MU-Sounding frame can be issued to the active members of the group in order to continuously monitor the interference levels, via step 310, between stations. The interference can be expected to change with varying channel conditions, and occasionally the members of the group will need to be adjusted. Periodic MU-sounding will enable the AP to move some stations out of the group, by detecting interference conditions that exceed preset limits at step 318, via step 320, and validate new stations as members.

Figure 4A:
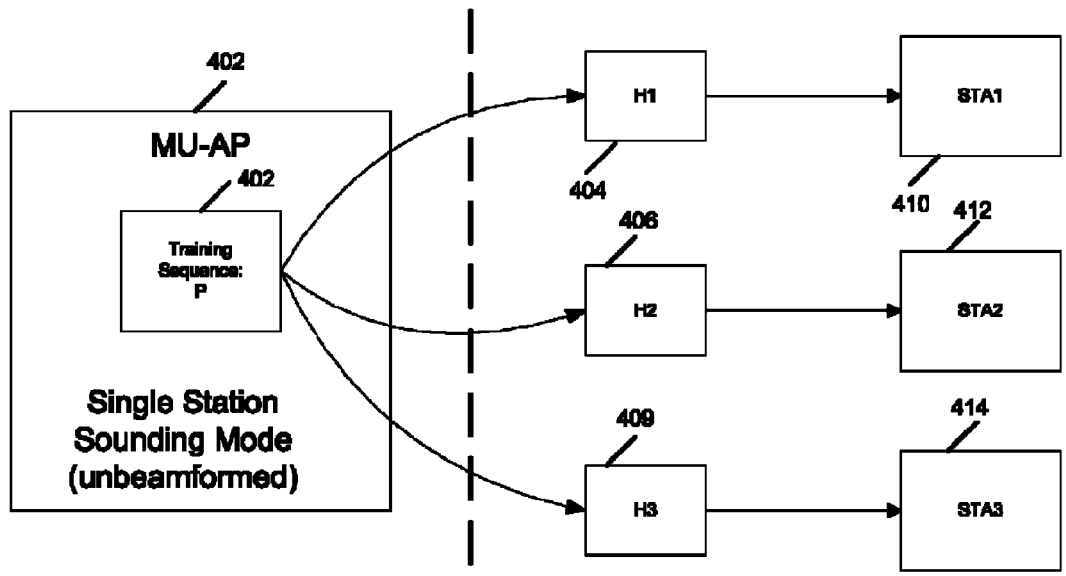
FIG. 4 illustrates a flowchart of multi-station AP sounding the channels to 3 stations with (a) unbeamformed CSI feedback, and (b) beamformed sounding for MU group validation according to an embodiment of the present invention.
Figure 4B:
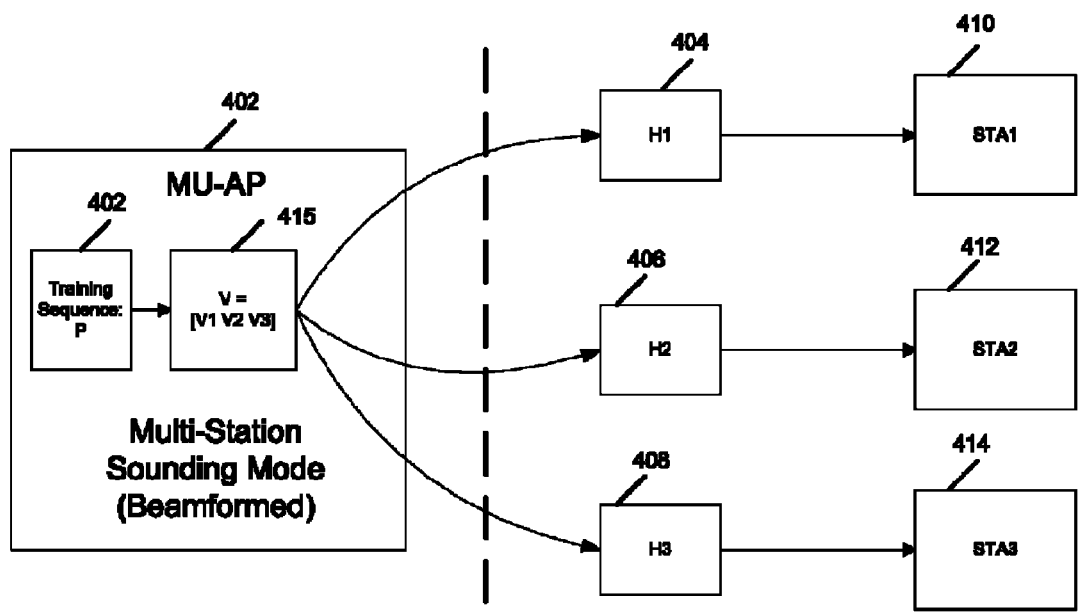

The formation and validation of a station group is shown as a two-step sounding process in FIGS. 4a and 4b. In FIG. 4a, the initial sounding is done to the three stations 410-414 so that the AP 402 has the CSI information of these channels 406-409 for each station. The MU CSI is the aggregated channel response:

$$\hat{H} = \begin{bmatrix} \hat{H}_1 \\ \hat{H}_2 \\ \hat{H}_3 \end{bmatrix}$$

The precoding matrices V1, V2, and V3 are computed as described above. Then the second sounding stage as shown in FIG. 4B is shown to ensure that the interference between the stations 410-414 is acceptable. The interference levels are measured in the off-diagonal terms of the aggregate sounding response:

MU-Sounding Response:

$$\hat{H}_{precoded} = \begin{bmatrix} \hat{H}_1 \\ \hat{H}_2 \\ \hat{H}_3 \end{bmatrix} [V_1 \quad V_2 \quad V_3]$$

$$= \begin{bmatrix} [\hat{H}_1 V_1 \quad \hat{H}_1 V_2 \quad \hat{H}_1 V_3] \\ [\hat{H}_2 V_1 \quad \hat{H}_2 V_2 \quad \hat{H}_2 V_3] \\ [\hat{H}_3 V_1 \quad \hat{H}_3 V_2 \quad \hat{H}_3 V_3] \end{bmatrix}$$

Figure 5:
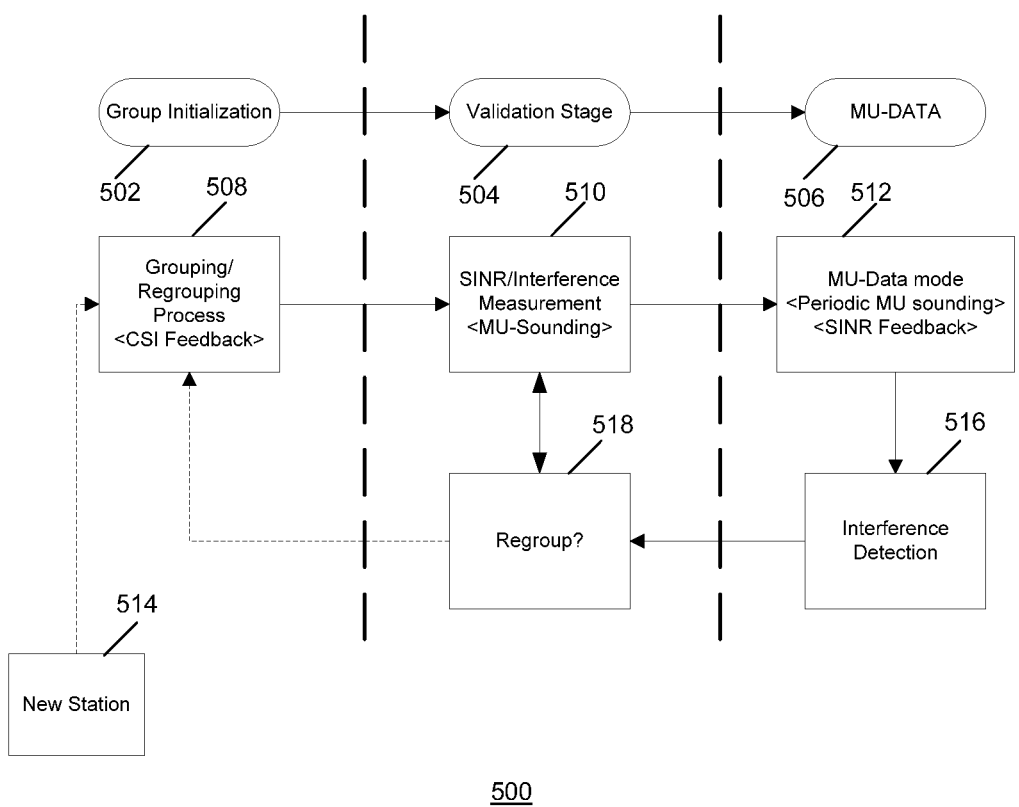
FIG. 5 illustrates a flowchart of group formation/validation according to an embodiment of the present invention.

In this aggregated response, each row corresponds to the MU-Sounding response. The diagonal terms correspond to the particular station's beamformed channel, such as $\hat{H}_1 V_1$ for STA1 410, whereas the off-diagonal responses, such as $\hat{H}_1 V_2$ and $\hat{H}_1 V_3$ represent the measured interference levels. In the system design, the each STA 410-414 can send MU-Sounding response so that the AP 402 can estimate the interference, and validate the MU group, or the each STA 410-414 can estimate the interference from the other stations by comparing relative strength of the diagonal terms to the off-diagonal terms (this is referred to as the Signal-to-Interference Ratio, or SINR, as also shown in FIG. 5). The off-diagonal terms should be relatively small to indicate good isolation between the stations.

An example from the above 3 station's scenario of interference metrics that can be measured at the station 1 and sent back to the AP as part of an interference feedback can be represented as:

$$SINR_1(i) = \frac{\|\hat{H}_1 V_1\|}{\|\hat{H}_1 V_i\|}, i = 2, 3.$$

In this case, the metrics $SINR_1(1)$ and $SINR_1(2)$ are simply the ratio of measured energy from the other stations, 2 and 3, respectively, with respect to the signal energy for the intended station, which is represented by: $\|\hat{H}_1 V_1\|$.

Through period MU-sounding, if the interference is detected to be too large, then the interfering stations can be separated into different groups (regrouping) by removing one of the particular stations. This detection and regrouping is indicated by steps 316, 318 and 320 in FIG. 3.

The MU group process 500 described can be implemented as a three stage process shown in FIG. 5, whereby the initial group is formed by computing the Vi precoding matrices. The stages comprise a group initialized state 502, a validation state 504 and a MU Data stage 500. The initial candidate group is then validated prior to commencing MU-data 500 operation by issuing a MU sounding packet, as discussed above. The interference levels between the stations are then measured at the individual stations and fed back to the AP, via step 510, or at the AP using the MU Sounding response (beamformed). This is shown as the Validation Phase 504 in FIG. 5. If the measured interference levels between all the stations are acceptable, then MU-Data 506 mode can start. If not, the stations are recognized via step 513. In this mode, the validate precoding matrices are used to transmit data to the remote stations simultaneously.

During the MU-Data stage 506, periodic MU-soundings, via step 512, are issued to the stations in the group to make sure channel conditions have not corrupted the MU data 506 operation, via step 516. In addition, the process extends to allow an operation MU-AP to form new groups, as channel conditions change (discussed above, by removing an interfering station), or by accommodating new MU STAs 514 that may join the network, via step 518. As a new station joins (as shown in FIG. 5), via step 514, this station can be grouped with existing stations, via step 508, into a candidate group after an initial unbeamformed sounding request/response. The new group is then validated prior to the start of MU-data 512 transmission, as discussed above.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. A method of operation in a multi-user system comprising:
    sending a first sounding request to a plurality of stations by an access point (AP), wherein channel state information from each responding station is gathered by the AP and is used to divide the plurality of stations into at least one group;
    sending a second sounding request by the AP to the at least one group, wherein channel state information from each responding station in the at least one group is gathered by the AP and is used to calculate a set of precoding matrixes that minimize interference between the plurality of stations in the at least one group; and
    sending a third sounding request to the plurality of stations in the at least one group using a precoded sounding to confirm final membership of the plurality of stations in the at least one group.

2. The method of claim 1 wherein the calculating step further comprises:
    comparing a transmission quality from the precoding matrix of a particular station with a predetermined threshold, wherein the particular station is qualified if the predetermined threshold is met and disqualified otherwise.

3. The method of claim 1, in which null spaces of each of the plurality of stations is calculated, further comprising:
    calculating a precoding matrix for each of the plurality of stations based upon the null spaces of the stations.

4. The method of claim 1, wherein after the at least one group is established, a final precoding matrix is validated by sending the third sounding request to the at least one group to assess levels of interference between each of the plurality of stations.

5. The method of claim 1, wherein the precoding matrix of each station must be orthogonal to the channel matrices of the other stations in the at least one group to ensure that the signal to one station does not interfere with other stations in the at least one group.

6. The method of claim 2, wherein the comparing step comprises determining if a precoding matrix for a particular station is within the null space of the other stations within the at least one group and determining if a channel of each station within the at least one group can be determined that lies in the null space of the other stations.

7. The method of claim 6, wherein precoding matrices are selected to maximize the received strength of the transmission to each station.

8. The method of claim 4, wherein the third sounding request is sent prior to the start of the data.

9. A system of operation in a multi-user system comprising:
   means for sending a first sounding request to a plurality of stations by an access point (AP), wherein channel state information from each responding station is gathered by the AP and is used to divide the plurality of stations into at least one group;
   means for sending a second sounding request by the AP to the at least one group, wherein channel state information from each responding station in the at least one group is gathered by the AP and is used to calculate a set of precoding matrixes that minimize interference between the plurality of stations in the at least one group; and
   means for sending a third sounding request to the plurality of stations in the at least one group using a precoded sounding to confirm final membership of the plurality of stations in the at least one group.

10. The system of claim 9 wherein the calculating step comprises:
   means for comparing a transmission quality from the precoding matrix of a particular station with a predetermined threshold, wherein the particular station is qualified if the predetermined threshold is met and disqualified otherwise.

11. The system of claim 9, in which null spaces of each of the plurality of stations is calculated, further comprising:
   calculating a precoding matrix for each of the plurality of stations based upon the null spaces of the stations.

12. The system of claim 9, wherein after the at least one group is established, a final precoding matrix is validated by sending the third sounding request to the at least one group to assess levels of interference between each of the plurality of stations.

13. The system of claim 9, wherein the precoding matrix of each station must be orthogonal to the channel matrices of the other stations in the at least one group to ensure that the signal to one station does not interfere with other stations in the at least one group.

14. The system of claim 10, wherein the comparing step comprises determining if a precoding matrix for a particular station is within the null space of the other stations within the at least one group and determining if a channel of each station within the at least one group can be determined to lie in the null space of the other stations.

15. The system of claim 9, wherein precoding matrices are selected to maximize the received strength of the transmission to each station.

16. The system of claim 12, wherein the third sounding request is sent prior to the start of the data.

* * * * *